(12) United States Patent
Chou

(10) Patent No.: US 8,227,745 B2
(45) Date of Patent: Jul. 24, 2012

(54) HEIGHT ADJUSTMENT APPARATUS AND PROJECTOR HAVING SAME

(75) Inventor: Cheng-Hung Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 393 days.

(21) Appl. No.: 12/641,216

(22) Filed: Dec. 17, 2009

(65) Prior Publication Data
US 2011/0013154 A1 Jan. 20, 2011

(30) Foreign Application Priority Data
Jul. 20, 2009 (CN) .......................... 2009 1 0304570

(51) Int. Cl.
*H01J 5/02* (2006.01)
(52) U.S. Cl. ........................................ 250/239; 353/119
(58) Field of Classification Search .................. 250/239, 250/208.1; 353/119, 101, 69, 70
See application file for complete search history.

(56) References Cited

U.S. PATENT DOCUMENTS
4,172,657 A * 10/1979 Watanabe et al. ............... 355/55
* cited by examiner

*Primary Examiner* — Que T Le
(74) *Attorney, Agent, or Firm* — Altis Law Group, Inc.

(57) ABSTRACT

A height adjustment apparatus for a projector includes a lifting assembly, a pushing rod, and an operation member. The projector includes a bottom wall having a recessed portion extending towards the inner side of the projector. The lifting assembly is received in the recessed portion, and includes a housing secured to the recessed portion, a supporting member, a first engaging member, and a second engaging member. The supporting member has one end pivotably connected to the housing the other end capable of being rotated out of the recessed portion. The first engaging member is connected to the supporting member and includes a first toothed engaging surface. The second engaging member includes a second toothed engaging surface, and is slidable in the housing. The pushing rod and the operation member control the engagement between the first and second toothed engaging surfaces to allow the supporting member to rotate or not.

20 Claims, 6 Drawing Sheets

HEIGHT ADJUSTMENT APPARATUS AND PROJECTOR HAVING SAME

BACKGROUND

1. Technical Field

The present disclosure relates to projectors and, particularly, to a height adjustment apparatus for a projector and a projector having the same.

2. Description of Related Art

In general, projectors may require height adjustment for proper display. One form of adjustment in use is a hanging fixture suspending the projector from the ceiling. This kind of arrangement is inconvenient for height adjustment. In another common solution, projectors are placed on a table and are accordingly height-adjusted by way of one or more threaded posts adjustably extending downward from the underside of the projector. This is also an inconvenient operation and cannot adjust the height of the projector quickly.

What is needed, therefore, is a convenient height adjustment apparatus for a projector to overcome or at least mitigate the above-described problem.

BRIEF DESCRIPTION OF THE DRAWINGS

Many aspects of the present height adjustment apparatus and projector can be better understood with reference to the accompanying drawings. The components in the drawings are not necessarily drawn to scale, the emphasis instead being placed upon clearly illustrating the principle of the present height adjustment apparatus and projector. In the drawings, all the views are schematic.

DETAILED DESCRIPTION

Embodiments of the present disclosure will now be described in detail below, with reference to the accompanying drawings.

Figure 1:
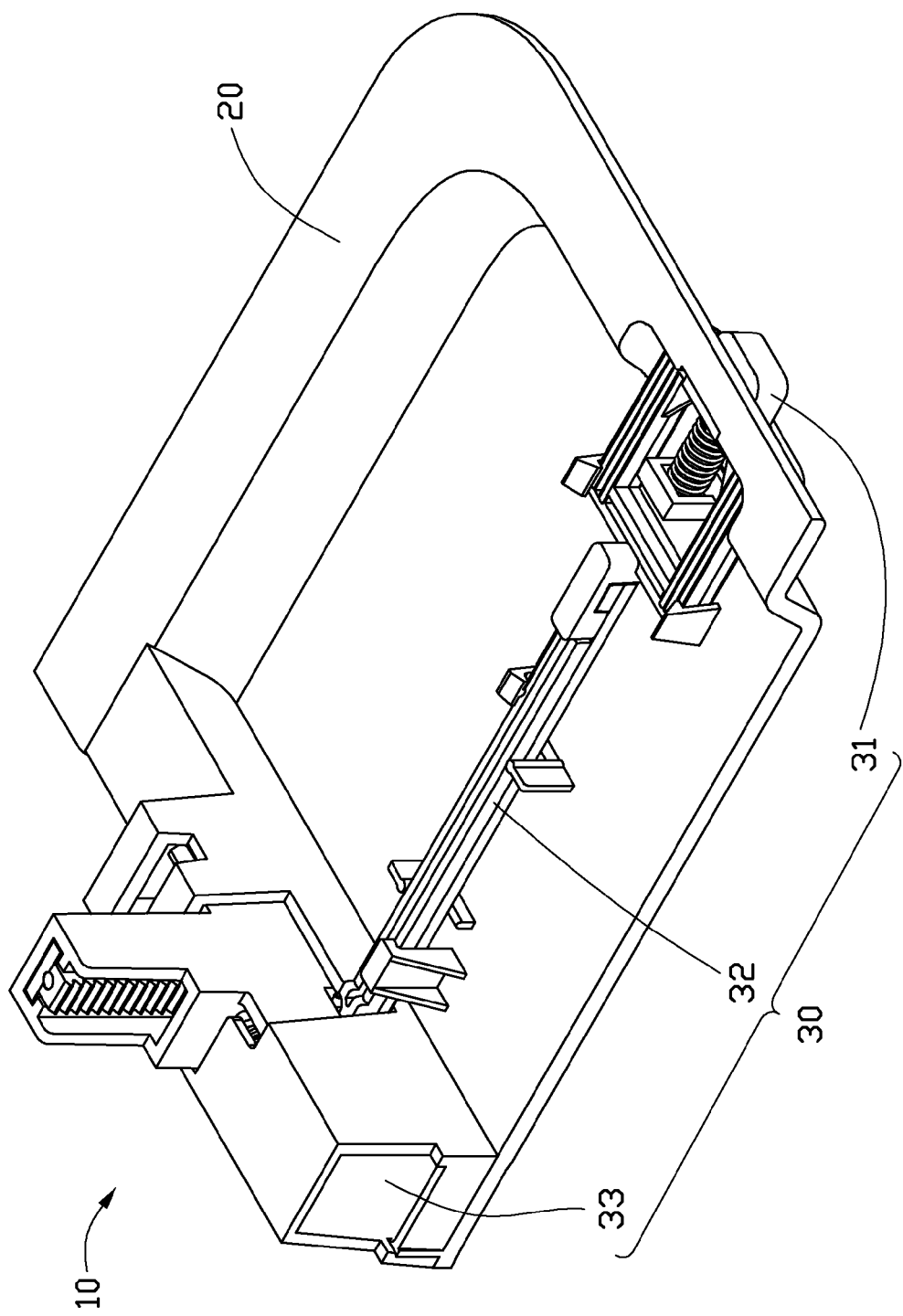
FIG. 1 is an isometric view of a projector including a height adjustment apparatus according to an exemplary embodiment.

Referring to FIG. 1, a projector 10, according to an exemplary embodiment, is shown. The projector 10 includes a casing 20 and a height adjustment apparatus 30.

Figure 2:
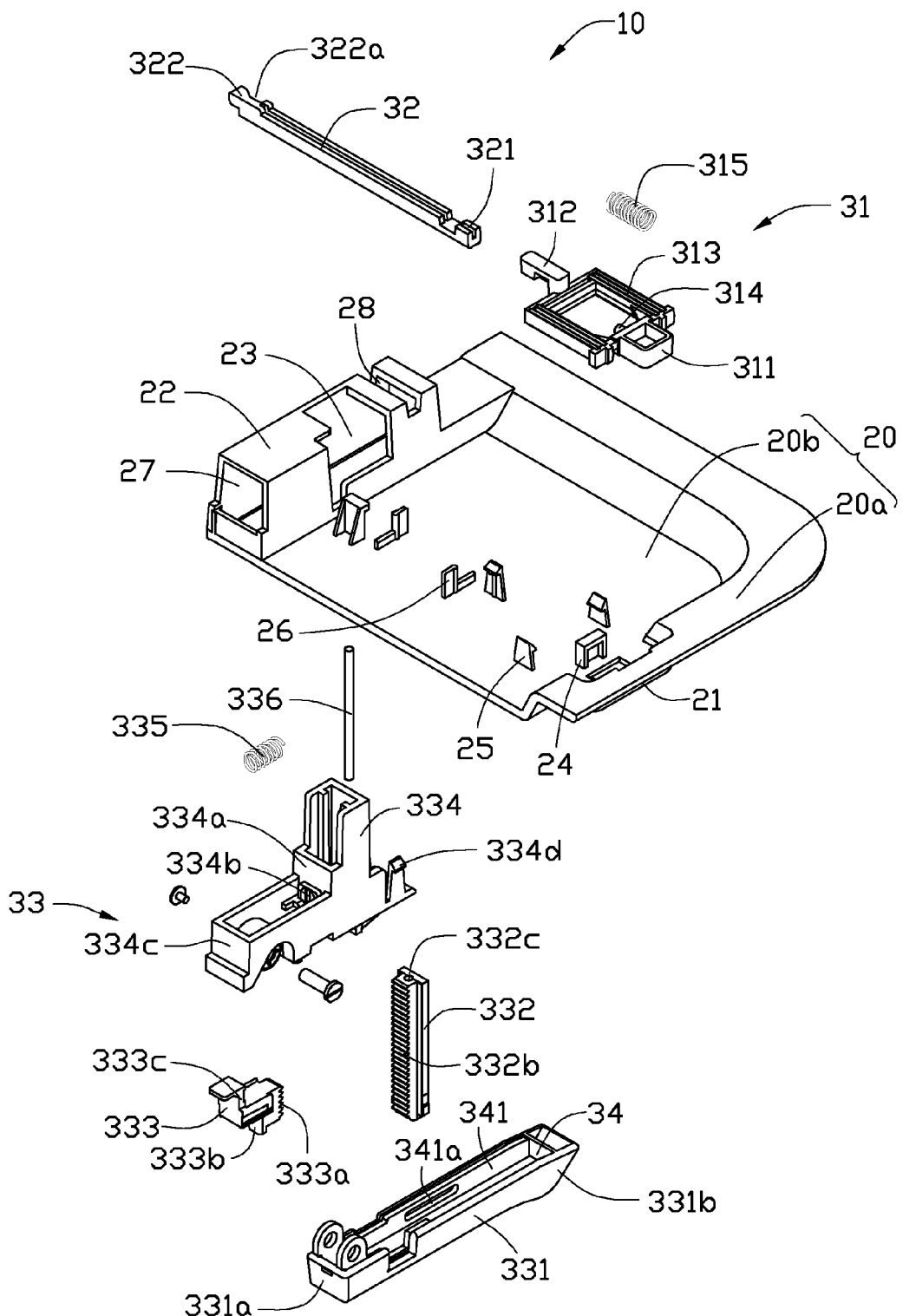
FIG. 2 is an exploded, isometric view of the projector of FIG. 1.
Figure 3:
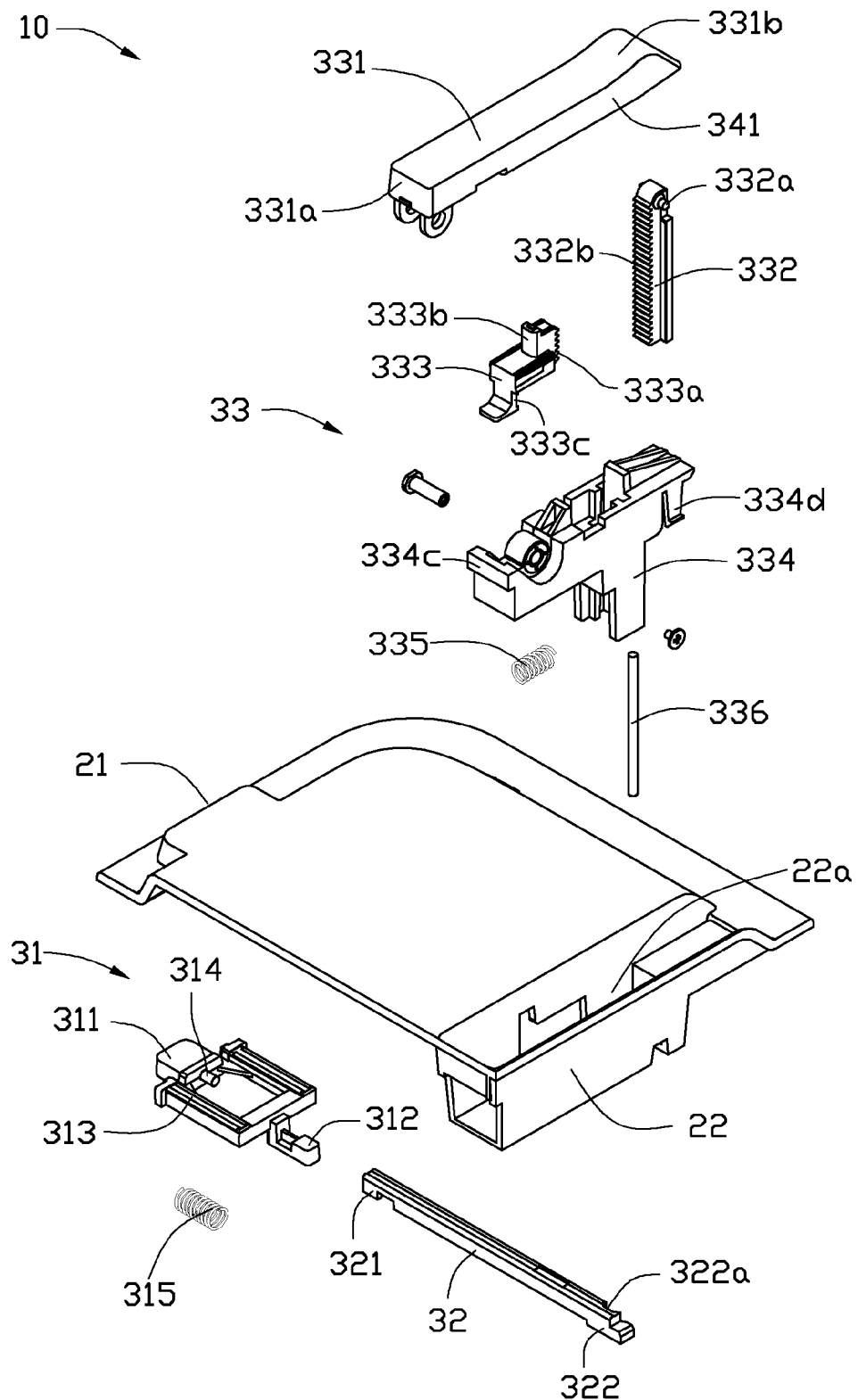
FIG. 3 is an exploded, isometric view of the projector of FIG. 1, viewed from another perspective different from FIG. 2.

Further referring to FIGS. 2 and 3, the casing 20 includes a sidewall 20a and a bottom wall 20b. The sidewall 20a defines a first opening 21 formed on a bottom portion thereof near to the bottom wall 20b. The bottom wall 20b includes a recessed portion 22 extending towards the inner side of the casing 20 from the bottom wall 20b. The recessed portion 22 defines a receiving space 22a and a second opening 23 communicating with the receiving space 22a. The second opening 23 is substantially aligned with the first opening 21. The bottom wall 20b further includes a first block 24, two first guide protrusions 25, and four second guide protrusions 26 on the inner surface of the bottom wall 20b. The first block 24, the two first guide protrusions 25, and the four second guide protrusions 26 are located between the first opening 21 and the recessed portion 22. The first block 24 is substantially aligned with and in front of the first opening 21.

The height adjustment apparatus 30 includes an operation member 31, a pushing rod 32, and a lifting assembly 33.

The lifting assembly 33 is received in the receiving space 22a of the recessed portion 22. The lifting assembly 33 includes a supporting member 331, a first engaging member 332, a second engaging member 333, a housing 334, and a first elastic member 335.

The supporting member 331 includes a first end 331a and a second end 331b opposite to the first end 331a. The first end 331a is pivotably connected to the housing 334, and the second end 331b can be rotated out of the receiving space 22a to support the projector 10. The height of the projector 10 can be adjustable by rotating the supporting member 331.

The first engaging member 332 is received in the housing 334. The first engaging member 332 is strip-shaped and is substantially perpendicular to the bottom wall 20b of the casing 20. The first engaging member 332 is slidable in the housing 334 along a direction substantially perpendicular to the bottom wall 20b of the casing 20. The bottom end of the first engaging member 332 is connected to the supporting member 331. In the present embodiment, the supporting member 331 defines a receiving slot 34 for receiving the bottom end of the first engaging member 332 therein, a sidewall 341 of the receiving slot 34 defines a linear latching groove 341a, and the first engaging member 332 includes a projection 332a latching and slidable in the linear latching groove 341a. The first engaging member 332 includes a first toothed engaging surface 332b substantially perpendicular to the bottom wall. The teeth formed on the first toothed engaging surface 332b extend along a direction substantially parallel to the bottom surface 20b of the casing 20. In order to increase the weight of the first engaging member 332, the first engaging member 332 further defines a receiving hole 332c for receiving ballast such as a metal rod 336 therein.

The second engaging member 333 is received in the housing 334. The second engaging member 333 includes a second toothed engaging surface 333a facing and engagable with the first toothed engaging surface 332b of the first engaging member 332. The second engaging member 333 is slidable in the housing 334 along a direction substantially perpendicular to the second toothed engaging surface 333a. The second engaging member 333 further includes a pressing surface 333b facing away from the second toothed engaging surface 333a, and a resisting wall 333c substantially parallel to the second toothed engaging surface 333a. The pressing surface 333b can be pressed by the pushing rod 32. The housing 334 includes a resisting wall 334a, opposite to the resisting wall 333c, disposed between the first engaging member 332 and the second engaging member 333. The first elastic member 335 is compressed between the resisting wall 333c and the resisting wall 334a. The first elastic member 335 and the pushing rod 32 cooperatively move the second engaging member 333 towards and away from the first engaging member 332. In the present embodiment, the first elastic member 335 is a spring with one end resisting the resisting wall 333c of the second engaging member 333 and the other end received in a blind hole 334b defined in the resisting wall 334a of the housing 334.

The housing 334 is received in the receiving space 22a of the recessed portion 22, and is secured to the recessed portion 22. In the present embodiment, one end 334c of the housing 334 is received in an opening 27 of the recessed portion 22, and the other end of the housing 334 includes two latching protrusions 334d for latching with a latching groove 28 of the recessed portion 22.

The pushing rod 32 includes a connecting end 321 and a pressing end 322 opposite to the connecting end 321. The connecting end 321 connects to the operation member 31, and the pressing end 322 extend into the housing 334 from the second opening 23 to press the pressing surface 333b of the second engaging member 333. The pressing end 322 includes a sloped surface 322a facing and contacting with the pressing surface 333b of the second engaging member 333. The distance between the sloped surface 322a and the first toothed engaging surface 332b of the first engaging member 332 increases from the pressing end 322 towards the connecting end 321. The pushing rod 32 is slidable towards and away from the recessed portion 22 of the bottom wall 20b of the casing 20. In the present embodiment, the four second guide protrusions 26 are located at two opposite side of the pushing rod 32 for guiding direction of movement of the pushing rod 32.

The operation member 31 includes an operation portion 311, a connecting portion 312, a receiving frame 313 connecting between the operation portion 311 and the connecting portion 312, and a second elastic member 315. The operation portion 311 is secured to an end of the receiving frame 313 facing the first opening 21, and is exposed out of the casing 20 from the first opening 21. The connecting portion 312 is secured to an end of the receiving frame 313 away from the operation portion 311 to connect to the pushing rod 32. The receiving frame 313 receives the block 24 therein. The second elastic member 315 is disposed between the inner surface of the receiving frame 313 adjacent to the operation portion 311 and the block 24. In the present embodiment, the inner surface of the receiving frame 313 adjacent to the operating portion 311 has a positioning post 314, and the second elastic member 315 is a spring with one end sleeving the positioning post 314 and the other end resisting the block 24. The operation member 31 is slidable towards and away from the recessed portion 22 of the bottom wall 20b of the casing 20. In the present embodiment, the two first guide protrusions 25 are located at two opposite side of the receiving frame 313 for guiding the direction of movement of the operation member 31.

When the height adjustment apparatus 30 is assembled, the first engaging member 332, the second engaging member 333, and the first elastic member 335 are firstly assembled in the housing 334, then the supporting member 331 is connected to the housing 334 and the first engaging member 332. Then the lifting assembly 33, including the supporting member 331, the first engaging member 332, the second engaging member 333, the housing 334, and the first elastic member 335, are received in the receiving space 22a of the recessed portion 22 and secured to the recessed portion 22. Then the operation member 31 and the pushing rod 32 can be assembled in the casing 20. Thus the height adjustment apparatus 30 is obtained.

Figure 4:
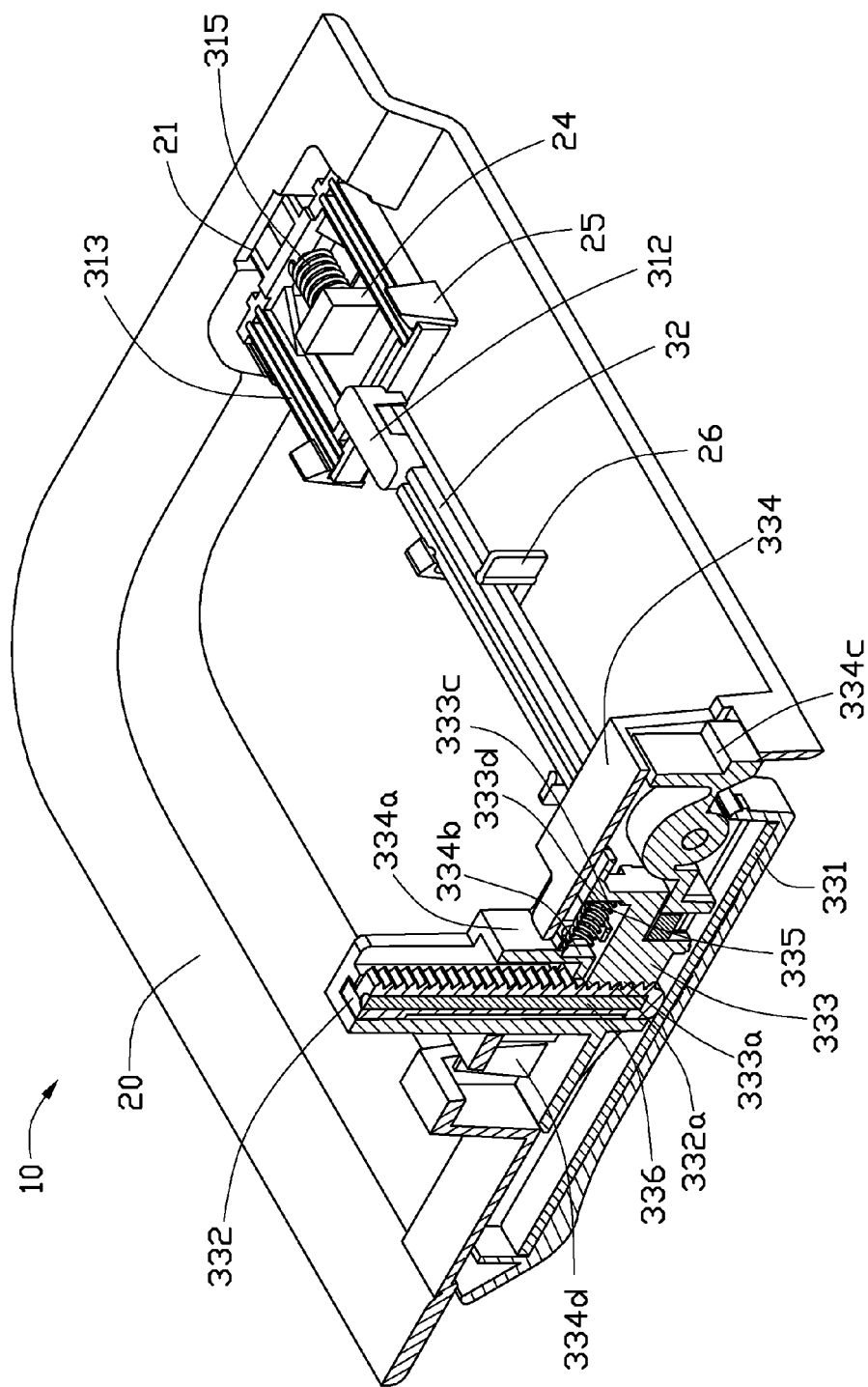
FIGS. 4-6 are cutaway views of the projector of FIG. 1 with height adjustment apparatus in different using states.
Figure 5:
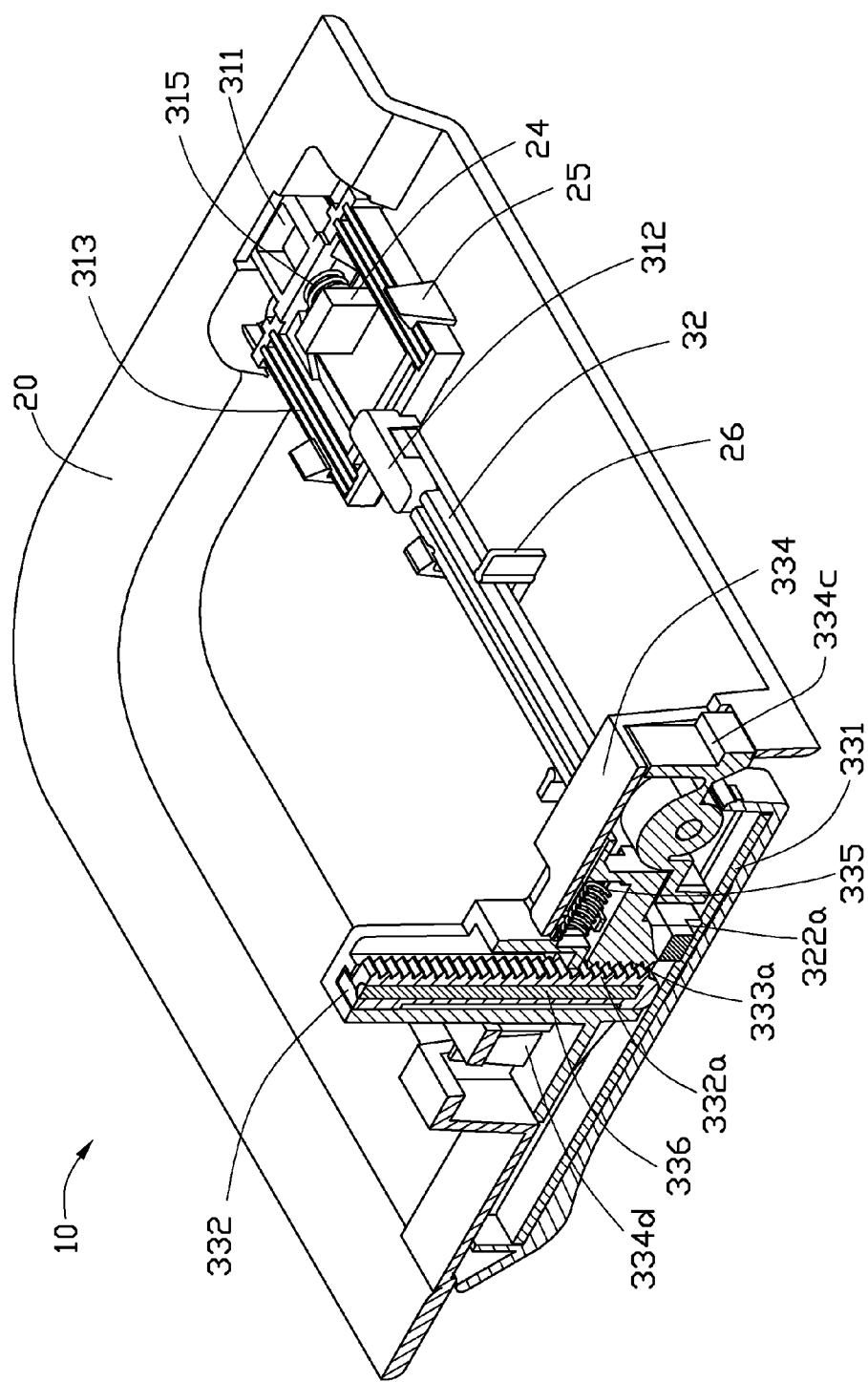
Figure 6:
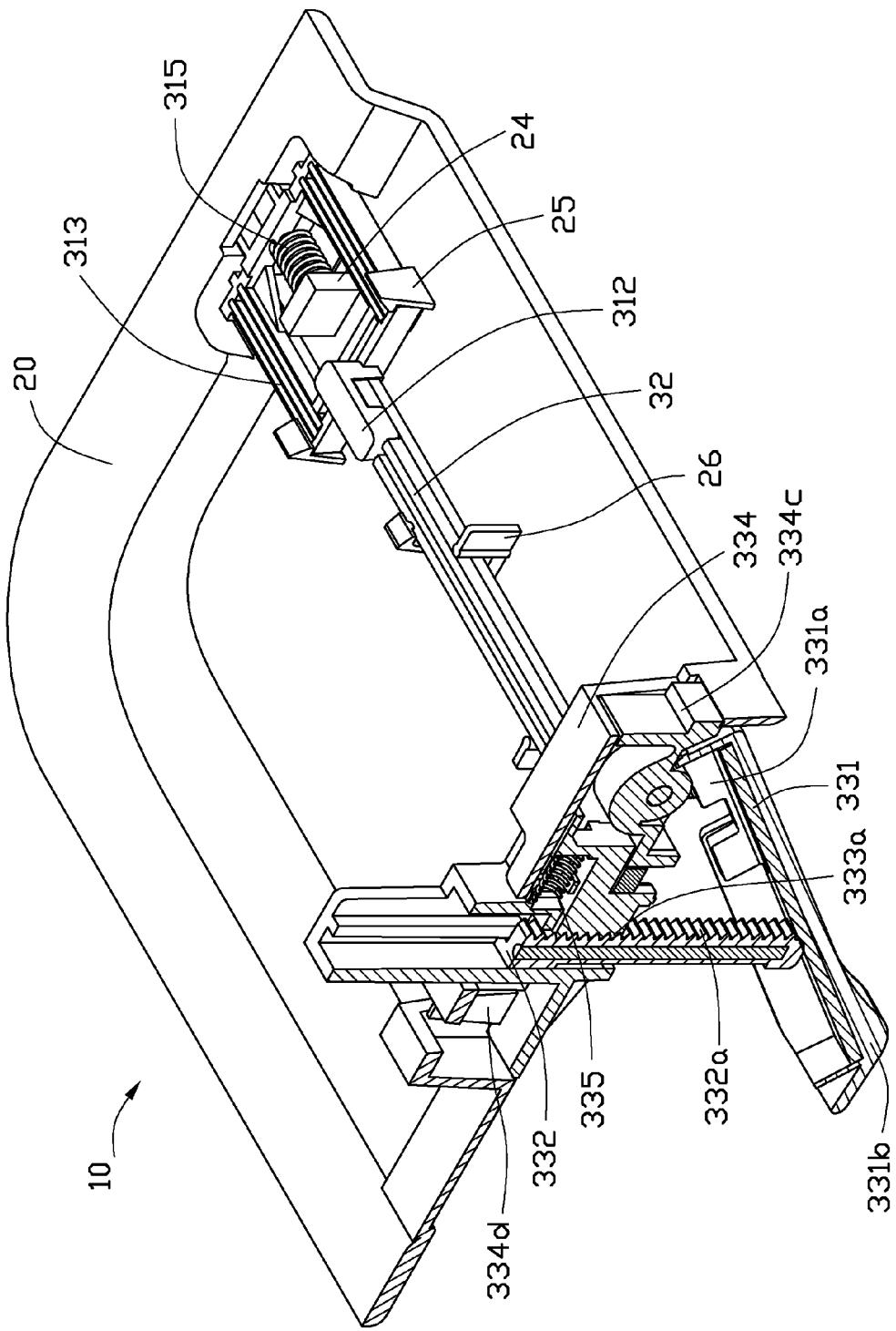

Referring to FIGS. 4-6, when the operating member 31 is pressed, the pushing rod 32 will move relative to the second engaging member 333, and the distance between the first engaging member 332 and the sloped surface 322a increases. The second toothed engaging surface 333a will be separated from the first toothed engaging surface 332b of the first engaging member 332 by the elastic force of the first elastic member 335. Then, the supporting member 331 can be rotated out of the receiving space 22a by gravity acting on the supporting member 331 and the first engaging member 332, or rotated into the receiving space 22a by an external force. After the projector 10 is adjusted to a proper height, the operating member 31 is released and the operating member 31 moves towards the first opening 21 by the elastic force of the second elastic member 315, at which time, the second toothed engaging surface 333a will latch with the first toothed engaging surface 332b of the first engaging member 332 to prevent the first engaging member 332 from moving and the supporting member 331 from rotating.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A height adjustment apparatus for a projector, the projector comprising a sidewall and a bottom wall, the sidewall defining a first opening, and the bottom wall comprising a recessed portion extending towards the inner side of the projector, the height adjustment apparatus comprising:
   a lifting assembly received in the recessed portion, the lifting assembly comprising:
      a housing secured to the recessed portion;
      a supporting member comprising a first end pivotably connected to the housing, and a second end capable of being rotated out of the recessed portion;
      a first engaging member with a bottom end thereof connected to the supporting member, the first engaging member being slidable in the housing along a direction substantially perpendicular to the bottom wall of the projector, and comprising a first toothed engaging surface substantially perpendicular to the bottom wall of the projector; and
      a second engaging member comprising a second toothed engaging surface facing and engagable with the first toothed engaging surface of the first engaging member, the second engaging member being slidable in the housing along a direction substantially perpendicular to the second toothed engaging surface, and comprising a pressing surface facing away from the second toothed engaging surface;
   a pushing rod comprising a connecting end and a pressing end opposite to the connecting end, the pressing end comprising a sloped surface facing and contacting with the pressing surface of the second engaging member, the distance between the sloped surface and the first toothed engaging surface of the first engaging member increasing from the pressing end towards the connecting end; and
   an operation member exposed out from the first opening for moving the pushing rod towards and away from the recessed portion.

2. The height adjustment apparatus as claimed in claim 1, wherein the first engaging member is strip-shaped and is substantially perpendicular to the bottom wall.

3. The height adjustment apparatus as claimed in claim 1, wherein the supporting member defines a receiving slot for receiving the bottom end of the first engaging member therein, a sidewall of the receiving slot defines a linear latching groove, and the first engaging member comprises a projection latching and slidable in the linear latching groove.

4. The height adjustment apparatus as claimed in claim 1, wherein the teeth formed on the first toothed engaging surface extend along a direction substantially parallel to the bottom surface.

5. The height adjustment apparatus as claimed in claim 1, wherein the lifting assembly further comprises a metal rod, and the first engaging member defines a receiving hole for receiving a metal rod therein.

6. The height adjustment apparatus as claimed in claim 1, wherein the lifting assembly further comprises a first elastic member; the second engaging member further comprises a first resisting wall substantially parallel to the second toothed engaging surface; the housing comprises a second resisting wall disposed between the first engaging member and the second engaging member; and the first elastic member is compressed between the first resisting wall and the second resisting wall.

7. The height adjustment apparatus as claimed in claim 6, wherein the first elastic member is a spring with one end resisting the first resisting wall and the other end received in a blind hole defined in the second resisting wall of the housing.

8. The height adjustment apparatus as claimed in claim 1, wherein the bottom wall comprises a block substantially aligning with the first opening; the operation member comprises an operation portion, a connecting portion, a receiving frame, and a connecting portion; the operation portion is secured to an end of the receiving frame facing the first opening, and is exposed out of the projector from the first opening; the connecting portion is secured to an end of the receiving frame away from the operation portion to connect to the pushing rod; the receiving frame receives the block therein, a second elastic member is disposed between the inner surface of the receiving frame adjacent to the operation portion and the block.

9. The height adjustment apparatus as claimed in claim 8, wherein the bottom wall comprises a plurality of first guide protrusions located at two opposite side of the receiving frame for guiding the moving direction of the operation member.

10. The height adjustment apparatus as claimed in claim 1, wherein the bottom wall comprises a plurality of second guide protrusions located at two opposite side of the pushing rod for guiding the moving direction of the pushing rod.

11. A projector comprising:
a casing comprising a sidewall and a bottom wall, the sidewall defining a first opening, and the bottom wall comprising a recessed portion extending towards the inner side of the casing; and
a height adjustment apparatus comprising:
a lifting assembly received in the recessed portion, the lifting assembly comprising: a housing secured to the recessed portion; a supporting member comprising a first end pivotably connected to the housing, and a second end capable of being rotated out of the recessed portion; a first engaging member with a bottom end thereof connected to the supporting member, the first engaging member being slidable in the housing along a direction substantially perpendicular to the bottom wall of the projector, and comprising a first toothed engaging surface substantially perpendicular to the bottom wall of the projector; and a second engaging member comprising a second toothed engaging surface facing and engagable with the first toothed engaging surface of the first engaging member, the second engaging member being slidable in the housing along a direction substantially perpendicular to the second toothed engaging surface, and comprising a pressing surface facing away from the second toothed engaging surface;
a pushing rod comprising a connecting end and a pressing end opposite to the connecting end, the pressing end comprising a sloped surface facing and contacting with the pressing surface of the second engaging member, the distance between the sloped surface and the first toothed engaging surface of the first engaging member increasing from the pressing end towards the connecting end; and
an operation member exposed out from the first opening for moving the pushing rod towards and away from the recessed portion.

12. The projector as claimed in claim 11, wherein the first engaging member is strip-shaped and is substantially perpendicular to the bottom wall.

13. The projector as claimed in claim 11, wherein the supporting member defines a receiving slot for receiving the bottom end of the first engaging member therein, a sidewall of the receiving slot defines a linear latching groove, and the first engaging member comprises a projection latching and slidable in the linear latching groove.

14. The projector as claimed in claim 11, wherein the teeth formed on the first toothed engaging surface extend along a direction substantially parallel to the bottom surface.

15. The projector as claimed in claim 11, wherein the lifting assembly further comprises a metal rod, and the first engaging member defines a receiving hole for receiving a metal rod therein.

16. The projector as claimed in claim 11, wherein the lifting assembly further comprises a first elastic member; the second engaging member further comprises a first resisting wall substantially parallel to the second toothed engaging surface; the housing comprises a second resisting wall disposed between the first engaging member and the second engaging member; and the first elastic member is compressed between the first resisting wall and the second resisting wall.

17. The projector as claimed in claim 16, wherein the first elastic member is a spring with one end resisting the first resisting wall and the other end received in a blind hole defined on the second resisting wall of the housing.

18. The projector as claimed in claim 11, wherein the bottom wall comprises a block substantially aligning with the first opening; the operation member comprises an operation portion, a connecting portion, a receiving frame, and a connecting portion; the operation portion is secured to an end of the receiving frame facing the first opening, and is exposed out of the projector from the first opening; the connecting portion is secured to an end of the receiving frame away from the operation portion to connect to the pushing rod; the receiving frame receives the block therein, a second elastic member is disposed between the inner surface of the receiving frame adjacent to the operation portion and the block.

19. The projector as claimed in claim 18, wherein the bottom wall comprises a plurality of first guide protrusions located at two opposite side of the receiving frame for guiding the moving direction of the operation member.

20. The projector as claimed in claim 11, wherein the bottom wall comprises a plurality of second guide protrusions located at two opposite side of the pushing rod for guiding the moving direction of the pushing rod.

* * * * *